United States Patent [19]

Iby

[11] 4,175,576
[45] Nov. 27, 1979

[54] TENT

[76] Inventor: Jack Iby, 9553 Natick Ave., Sepulveda, Calif. 91343

[21] Appl. No.: 935,024

[22] Filed: Aug. 18, 1978

[51] Int. Cl.² .......................................... E04F 10/06
[52] U.S. Cl. ................................. 135/1 A; 135/5 AT
[58] Field of Search ................... 135/5 AT, 5 A, 1 A, 135/3 R, 3 A, 7.1 R

[56] References Cited

U.S. PATENT DOCUMENTS

| | | | |
|---|---|---|---|
| 1,290,824 | 1/1919 | Wittmann | 135/1 A |
| 1,394,579 | 10/1921 | Purcell | 135/1 A |
| 1,707,960 | 4/1929 | Gilkison | 135/1 A |
| 2,204,432 | 6/1940 | Morgadanes | 135/1 A |
| 3,779,302 | 12/1973 | Akers | 135/5 AT |
| 3,833,011 | 9/1974 | Duffy | 135/5 AT |

Primary Examiner—Reinaldo P. Machado
Attorney, Agent, or Firm—Smyth, Pavitt, Siegemund, Jones & Martella

[57] ABSTRACT

A tent for attachment to and from a van has a frame which includes two straps strung from the gutter edge to the lower edge of the vanside and held by means of clamps; a pair of braces extend obliquely from the straps and are held at their top by a pair of holding straps which are attached to the upper strap clamps. A cross bar interconnects the upper brace ends and a canvas and canopy is mounted to that frame.

6 Claims, 8 Drawing Figures

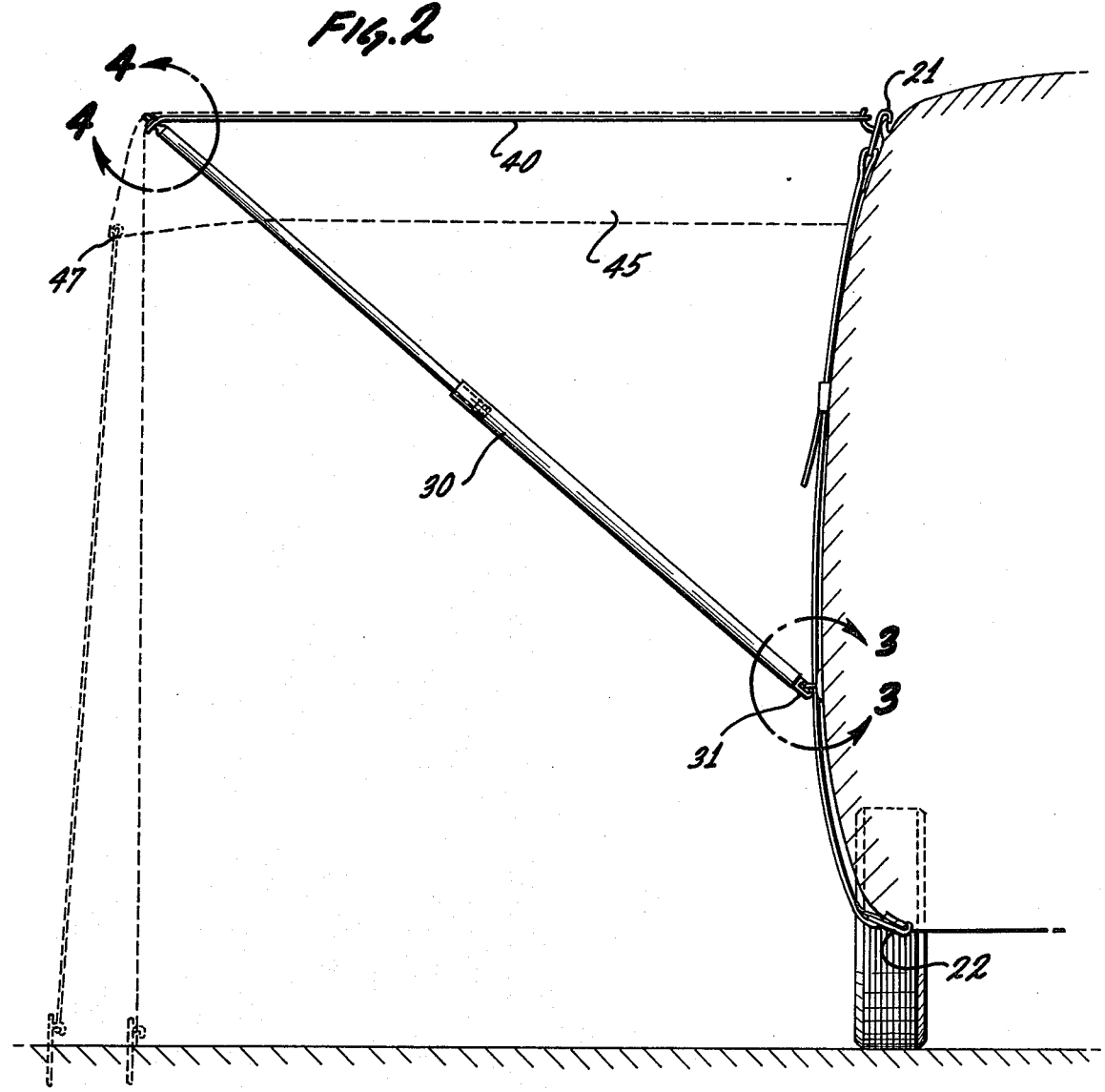
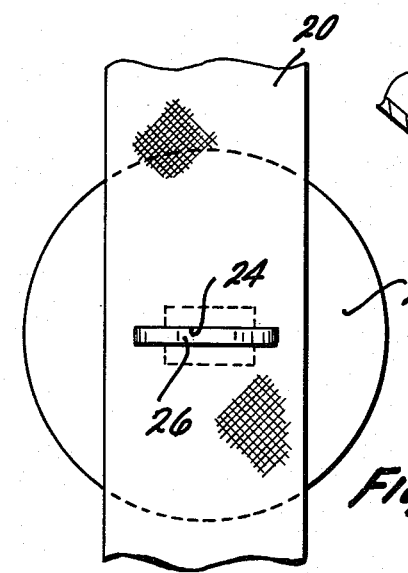
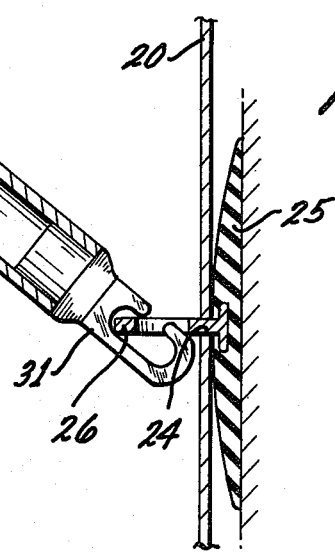

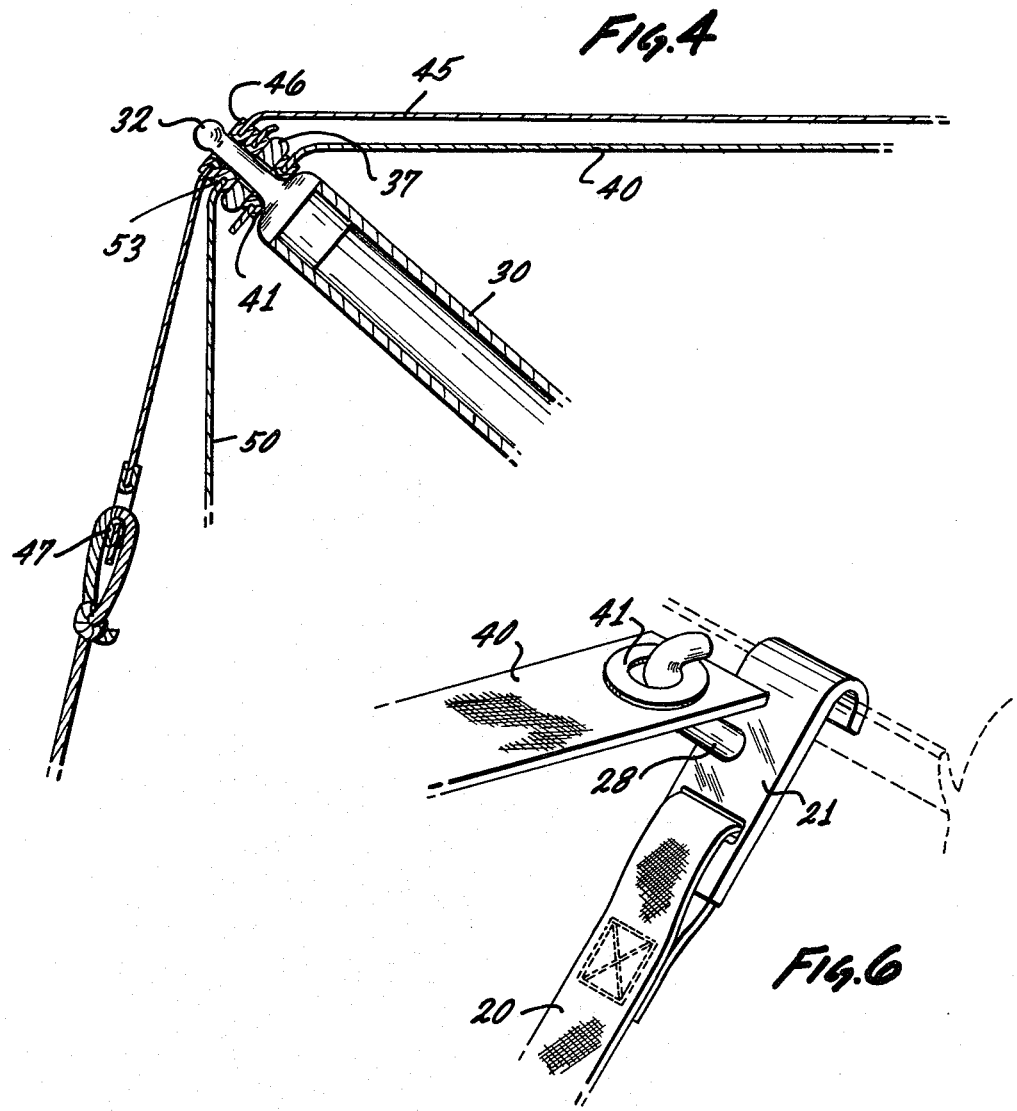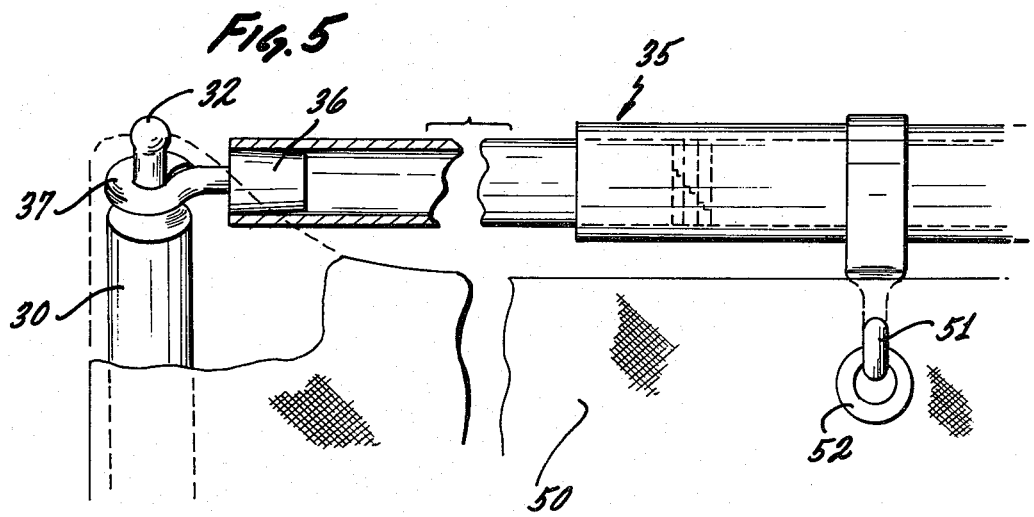

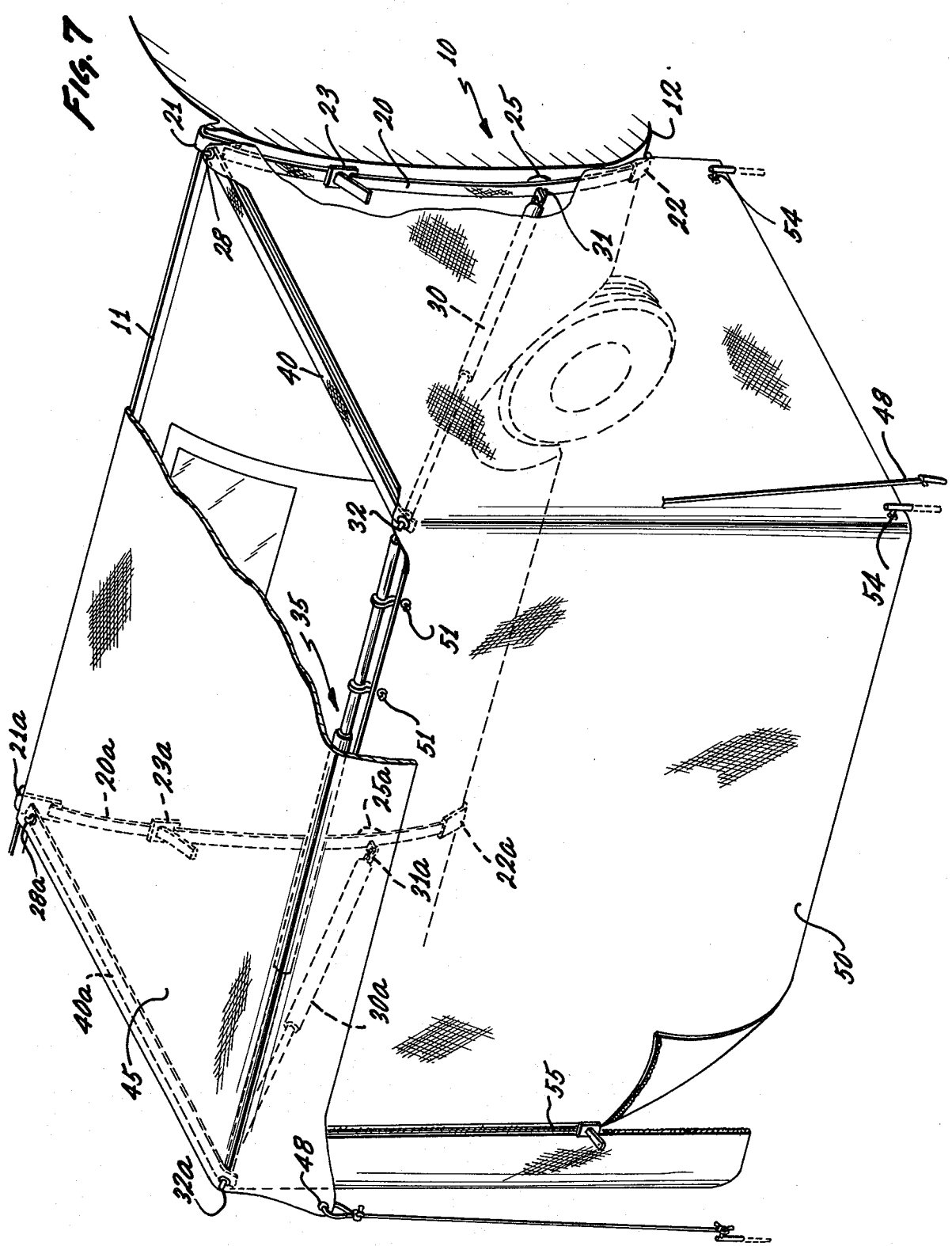

TENT

BACKGROUND OF THE INVENTION

The present invention relates to a tent constructed for being attached to the side of a van or the like and for being readily detached therefrom for disassembly.

Tent constructions are known generally in a large variety. Moreover, tents are known for being unfolded in canopy-like fashion from the side of a car, a van, or a recreational vehicle. Other types of construction are known in which such a tent is incorporated in some fashion in the vehicle. All these known constructions include some form of structural combination with the vehicle which includes bolting or other fastening, or may even require direct construction modification and adaption of the vehicle itself. As to the best of my knowledge, no truly detachable tent is known at the present time.

DESCRIPTION OF THE INVENTION

It is an object of the present invention to provide a new and improved tent constructed for being attached to one side of a van or the like without requiring structural modification of the vehicle.

It is a specific object of the invention to provide such a tent with a minimum of parts and permitting easy and simple erection as well as disassembly.

In accordance with the preferred embodiment of the present invention, it is suggested to provide a pair of straps to be clamped between the gutter edge on a van side and the lower edge of that side. Two braces or struts have one end each detachably connected to a point between the ends of a strap, for example, by means of eye hooks traversing a slot in the respective strap, and spaced from the van side by a suction cup. The load, however, is taken up by the straps. The other end of each brace is held by a horizontal strap which is fastened to one of the gutter clamps, to hold the respective brace in an oblique disposition. A crosspole is mounted on top of these upper brace ends. The sides of the tent are hung from the four corners of a rectangle as defined by the upper gutter clamps and the upper strut ends. A top canopy has gromlets slipped over these rectangle points. The front of the tent is suspended from the crosspole in curtain like fashion. The various elements are fastened basically by means of eye hooks or gromlets and pins or hooks, whereby particularly the upper ends of the struts are pins into which are slipped several gromlets and eyes.

DESCRIPTION OF THE DRAWINGS

While the specification concludes with claims particularly pointing out and distinctly clamping the subject matter which is regarded as the invention, it is believed that the invention, the objects and features of the invention and further objects, features and advantages thereof will be better understood from the following description taken in connection with the accompanying drawings in which:

FIG. 2 is a side view of the frame shown in FIG. 1;

FIG. 3 is a cross-section through a detail as indicated in FIG. 2, illustrating the connection between a brace and a strap;

FIG. 3a is a front view of a portion of the detail shown in FIG. 3 without the lower portion of the brace.

FIG. 4 is a cross-section of a further detail (upper corner) as indicated in FIG. 4 illustrating particularly various parts as fastened or otherwise connected to the top end of a brace;

FIG. 5 is a front view of the corner portion illustrated in FIG. 4;

FIG. 6 is a perspective view of the connection between a vertical and a horizontal strap; and FIG. 7 is a view similar to FIG. 1 but showing the tent as completely assembled.

Figure 1:
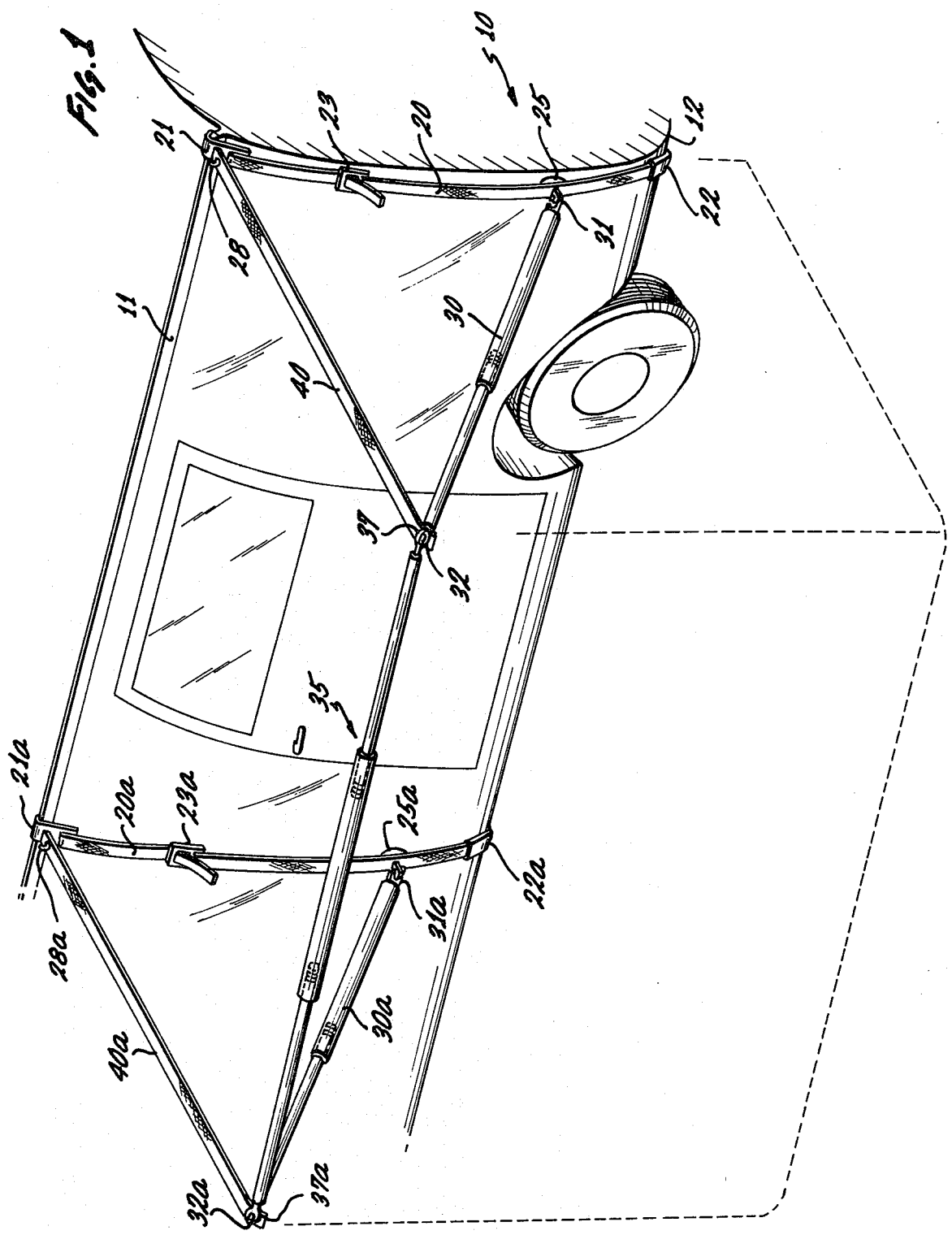
FIG. 1 is a perspective view of a tent frame in accordance with the preferred embodiment of the invention.

Proceeding now to the detailed description of the drawings, reference numeral 10 refers to a van or other vehicle to which is attached the tent in accordance with the preferred embodiment. The van, as all vehicles usually are, is provided with a gutter ridge 11 near its top. The bottom of the side of the vehicle ends in an edge 12. These parts of the vehicle are mentioned specifically as they are needed for the erection of the tent; however, they are not specifically provided for, but can be expected to be present.

The tent includes the following frame assembly (FIG. 1). A pair of straps 20 and 20a are detachably affixed to the van in that each strap is provided at its two ends with simple, hook-like clamps 21, 22 and 21a, 22a respectively. The two hooks of each strap respectively engage and grip around the gutter edge 11 and the lower van side edge 12. The straps, therefore, assume a vertical orientation. Buckles 23, 23a tighten the straps taught over the van side so that the hook clamps will not disengage.

Each strap has a slot such as 24 (FIGS. 3, 3a) through which extends an eye hook 26 pertaining to a suction cup 25. A second cup 25a has a hook 26a which traverses a corresponding slot in strap 20a and likewise spaces this strap a little from the van side. The suction cups have no load bearing function but are gently affixed to the van side to serve as spacer.

Aside from these mounting straps 20, 20a, the frame for the tent consists of a pair of poles, braces or struts 30, 30a, each being constructed as a pair of telescoped tubes with a lock to hold the tubes in a particular, telescoped disposition to each other. Twisting the tube releases the lock permitting, for example, the two tubes to be completely telescoped into each other. This way storage of the braces 30 and 30a is facilitated.

One tube of each pole is provided with a hook 13 which is hooked into the eye 26 of one of the cups. The other pole has a hook 31a for gripping through eye 26a in the same manner. Upon erecting the tent one will first thread the hooks 26, 26a through the respective strap slot, and hook them into the hooks 31, 31a. The suction cups will be attached to the van side only after the hooks are fully loaded in that fashion and tension the straps 20, 20a.

The respective other, upper end of each pole or brace is provided with an eye pin 32, 32a respectively. These pins are male fasteners for several different components of the tent and constitute the two outer, upper corners thereof. The only other rigid frame part is another telescoping tube 35 serving as cross pole and being constructed as a three-part element in which the middle part serves as spacer for the two outer parts. The three parts are locked to each other by twisting and can be released for telescoping the two outer tubes into the middle one for ease of storage. Full extension of the three tube cross pole may establish a width of, say 8' which will be the maximum width of the tent. These outer tubes of cross pole 35 carry plugs such as 36, (FIG. 5) and eye hooks 37, 37a are embedded (screwed into) the two plugs.

The eye hooks 37, 37a respectively receive the eye pins 32, 32a, so that the poles 30 and 30a together with cross pole 35 constitute an inverse U-frame whose legs are hooked to the spacing cups 25, 25a. This U-shaped frame can pivot about the spacer cups, but is held in position by a pair of straps 40, 40a. The straps 40, 40a each have gromlets 41 at their ends, and the gromlet of one end of each strap is slipped over one of the brace pins 32, 32a. For reasons below, these gromlets should be slipped under the eye hooks 37, 37a so that the weight of the pole 35 holes these straps in position.

The other end of each strap 40, 40a is hooked over a hook 28, 28a respectively mounted on the top clamp 21, 21a of the straps 20, 20a. This then completes the frame for the tent. In summary, this frame is constituted by the two vertical straps 20, 20a, the pair of obliquely extending struts, poles or braces 30, 30a, the cross pole 35, and a pair of horizontally extending holding straps 40, 40a. The load of the frame parts 30, 30a, and 35 is carried in parts by the straps 20, 20a in that the poles 30, 30a as hooked on the suction cups 25, 25a transmit the frame weight onto the straps by the engagement of eyes 26, 26a in the slots 24, 24a. The sole function of the suction cups as such is to hold a portion of the straps 20, 20a and particularly the hook ends of the poles 30, 30a away from the side of the van. Any residual weight of the tent is reacted as tension into the straps 40, 40a being held to the van gutter by the hooks 28, 28a.

A large piece of canvass 50 is used to establish the front and the tent sides. Gromlets 53 (see FIG. 4) are provided to hang the canvass onto the pins 32, 32a, and the hooks 28, 28a. These four parts define a rectangle of the frame from which the tent is suspended. Gromlets 52 are provided to suspend the front part of the canvass from the pole 35 in curtain like fashion by means of curtain hooks 51.

The canvass may actually be biparted but the two parts are fastened together by a zipper 55. Gromlets 53 near the bottom of the tent are provided for staking into the ground.

In order to complete a tent, a canopy 45 is provided with four gromlets such as 46, which are respectively slipped over the pins 32, 32a and the hooks 28, 28a. A pair of corner gromlets may be provided for attaching ropes 47 which in turn are tied to stakes in the ground.

It can readily be seen that the tent is of utmost simplicity and does not require any modification of the car; bolts are not screwed into the van side or top, and any particular frame mount is not needed. Upon erecting the tent, the two straps 20, 20a are hooked into the gutter and the lower side edge, and the buckles tighten the straps. The suction cups 25, 25a are inserted in the slots of the straps 20, 20a and the lower ends poles 30, 30a are hooked into the eyes of the spacer cups. The upper ends of poles or braces 30, 30a are individually held by the slipped on straps 40, 40a.

Next, the end eyes 37, 37a of pole 35 are slipped onto the holders 32a, 28 etc. The three parts of pole 35 may not be locked at first so that the length of this cross pole assembly 35 can be adjusted to the width of the tent established by the spacing between the straps 20, 20a as clamped to the van side. This completes the erection of the frame mounting. Next, canvas 50 is hung from the four corners as established by the pins and hooks 32, 32a, 28, 28a, and the front of the canvass is hooked into the curtain hooks 51. Finally, the top canopy is placed onto the above-mentioned four corners. The ends of the canopy and the bottom of the canvass sides may be tied down by stakes if desired. Disassembly is similarly simple and requires merely a reversal of the mounting and assembly steps and in the reverse order.

I claim:

1. A tent for attachment to the side of a van or similar kind of vehicle, comprising:
    a pair of frame straps to be hooked with one end each on a gutter edge of the van and with the respective other end around the bottom edge of a van side;
    a pair of poles serving as braces and being respectively hooked with one end to the straps at points between the strap ends;
    a pair of holding straps each detachably fastened by one end to the ends of the frame straps adjacent to gutter, the other ends of the holding straps being detachably fastened to the respective other ends of the poles;
    a cross pole detachably fastened to said other ends of the poles of the pair;
    tent sides hung from the corners of a rectangle as defined by the upper frame strap clamps and upper ends of the poles of the pair; and
    a canopy mounted on the corners of said rectangle.

2. A tent as in claim 1, said frame strap each having hooks at their respective end, a pin hook being mounted on top of the end hooks gripping around the gutter edge, said holding straps being fastened to said pin hooks.

3. A tent as in claim 1, said poles of the pair each being a pair of telescopes tubes.

4. A tent as in claim 1, said other ends of the poles of the pair being configured as pins, said cross pole having eye hooks at its ends, each said pin receiving (a) an eye hook of the cross pole, (b) the other end of one of the holding straps, (c) a gromlet of the tent sides and (d) a gromlet of the canopy.

5. A tent as in claim 1, said cross pole being their telescoped tubes.

6. A tent as in claim 1 and including suction cups each with a fastener respectively threaded through a slot in the frame straps, respectively for fastening to the one end and each of the poles of the pair.

* * * * *